United States Patent
Namikata

(10) Patent No.: US 7,907,308 B2
(45) Date of Patent: Mar. 15, 2011

(54) IMAGE PROCESSING SYSTEM DETECTING PRINT JOB LOG INFORMATION EMBEDDED AS A DIGITAL WATERMARK AND COMPUTING RELIABLITY THEREOF

(75) Inventor: Takeshi Namikata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 582 days.

(21) Appl. No.: 12/037,564

(22) Filed: Feb. 26, 2008

(65) Prior Publication Data

US 2008/0212136 A1   Sep. 4, 2008

(30) Foreign Application Priority Data

Mar. 2, 2007   (JP) .................... 2007-053337

(51) Int. Cl.
  G06K 15/02   (2006.01)
  G06K 19/06   (2006.01)
  G06F 7/04    (2006.01)
  G06F 15/16   (2006.01)
(52) U.S. Cl. ................ 358/3.28; 358/1.15; 726/26
(58) Field of Classification Search ........... 358/3.28, 358/1.14, 1.15, 1.18; 382/100, 135; 283/113, 283/902; 726/26, 32
See application file for complete search history.

(56) References Cited

U.S. PATENT DOCUMENTS

| | | | | |
|---|---|---|---|---|
| 5,699,493 A | * | 12/1997 | Davidson et al. | 358/1.15 |
| 7,058,214 B2 | * | 6/2006 | Tomomatsu | 358/3.28 |
| 7,184,571 B2 | * | 2/2007 | Wang et al. | 358/3.28 |
| 2007/0103715 A1 | * | 5/2007 | Nakata | 358/1.14 |

FOREIGN PATENT DOCUMENTS

| | | |
|---|---|---|
| JP | 10-503901 | 4/1998 |
| WO | WO 96/04746 | 2/1996 |

* cited by examiner

Primary Examiner — Scott A Rogers

(74) Attorney, Agent, or Firm — Cowan, Liebowitz & Latman, P.C.

(57) ABSTRACT

In a digital multi-function peripheral, image data to be output and first log information are generated based on an image forming job. Second log information embedded as digital watermark information is detected from the image data, and the reliability of the digital watermark information is computed. If the reliability is high, the first log information is held in a property storage unit 114 in an image management server 110. If the reliability is low, the first log information is held in the property storage unit 114 and the image data is held in a volume storage unit.

18 Claims, 13 Drawing Sheets

FIG. 12

| COMMAND | ADDITIONAL STORAGE REQUEST |
|---|---|
| INFORMATION TO BE STORED | |
| LOG INFORMATION FOR LAST JOB | SAME AS INFORMATION TO BE STORED |

1200

1001 — | DOCUMENT NAME | SIZE | THE NUMBER OF PAGES | CREATION DATE AND TIME |

1002 — | DEVICE PRODUCT NAME | PRODUCT NAME | IP ADDRESS | COMMENT | DEPARTMENT ID | USER NAME | IP ADDRESS |
| MAC ADDRESS | JOB TYPE | JOB NAME | THE NUMBER OF PAGES | THE NUMBER OF COPIES | START DATE AND TIME | END DATE AND TIME | JOB RESULT |

1003 — | PAGE NUMBER | FORMAT | PAPER SIZE | FILE SIZE |
| PAGE NUMBER | FORMAT | PAPER SIZE | FILE SIZE |
| ...... |

IMAGE PROCESSING SYSTEM DETECTING PRINT JOB LOG INFORMATION EMBEDDED AS A DIGITAL WATERMARK AND COMPUTING RELIABLITY THEREOF

BACKGROUND OF THE INVENTION

1. Field of the Invention

The present invention relates to image processing systems, image processing apparatuses, and image processing methods, and more particularly to an image processing system, image processing apparatus, and image processing method that allow tracing back formed images.

2. Description of the Related Art

In recent years, the widespread use of digital multi-function peripherals that integrate functions of a copier, printer, and facsimile has allowed easily copying and transmitting documents. While this enhances user convenience, a concern arises about an increased risk from the standpoint of information leaks, such as copying and transmission of confidential documents.

To address this concern, an image processing apparatus has been proposed in which all image data that is read, printed, or transmitted in processing such as copying or transmission is accumulated in a recording device (for example, see Japanese Patent Laid-Open No. 10-503901). This accumulation involves recording the image data along with log information about when and where the processing was done, and who did what kind of processing. Thus, if leaked information (often information printed on paper) is obtained, the image data recorded in the recording device can be checked to investigate and trace back which image processing apparatus was used for processing of an original document or original data for that information.

However, recording all image data processed in the apparatus as in the above conventional manner requires a recording device with an enormous capacity, which is very costly. Therefore, such a large-capacity recording device typically cannot be provided in a multi-function peripheral and is often provided on the server side over a network. This still poses problems, such as increased network traffic due to the enormous amount of recording data, and an inability to record recording data having an amount of data above the capability of the server.

SUMMARY OF THE INVENTION

The present invention has been made to solve the aforementioned problems, and it is an object of the present invention to provide an image processing system, image processing apparatus, and image processing method that allow reduction in the storage device capacity required for tracing back formed images.

According to one aspect of the present invention, there is provided an image processing system in which an image forming apparatus forming an image on a recording medium and an image management server having a storage unit are connected with each other, the image forming apparatus comprises:

a transmission unit adapted to transmit data to be stored in the storage unit to the image management server;

an image generation unit adapted to generate image data based on an image forming job;

a log generation unit adapted to generate first log information about the image forming job;

an analysis unit adapted to detect second log information embedded as a digital watermark from the image data and compute a reliability of the digital watermark; and a control unit adapted to perform control to transmit the first log information via the transmission unit if the reliability reaches a first level and to transmit the first log information and the image data via the transmission unit if the reliability does not reach the first level.

According to the present invention, the storage device capacity required for tracing back formed images can be significantly reduced.

Further features of the present invention will become apparent from the following description of exemplary embodiments with reference to the attached drawings.

BRIEF DESCRIPTION OF THE DRAWINGS

FIG. 12 is a diagram showing an example of an additional document information storage command for the image management server in the embodiment.

DESCRIPTION OF THE EMBODIMENTS

Figure 1:
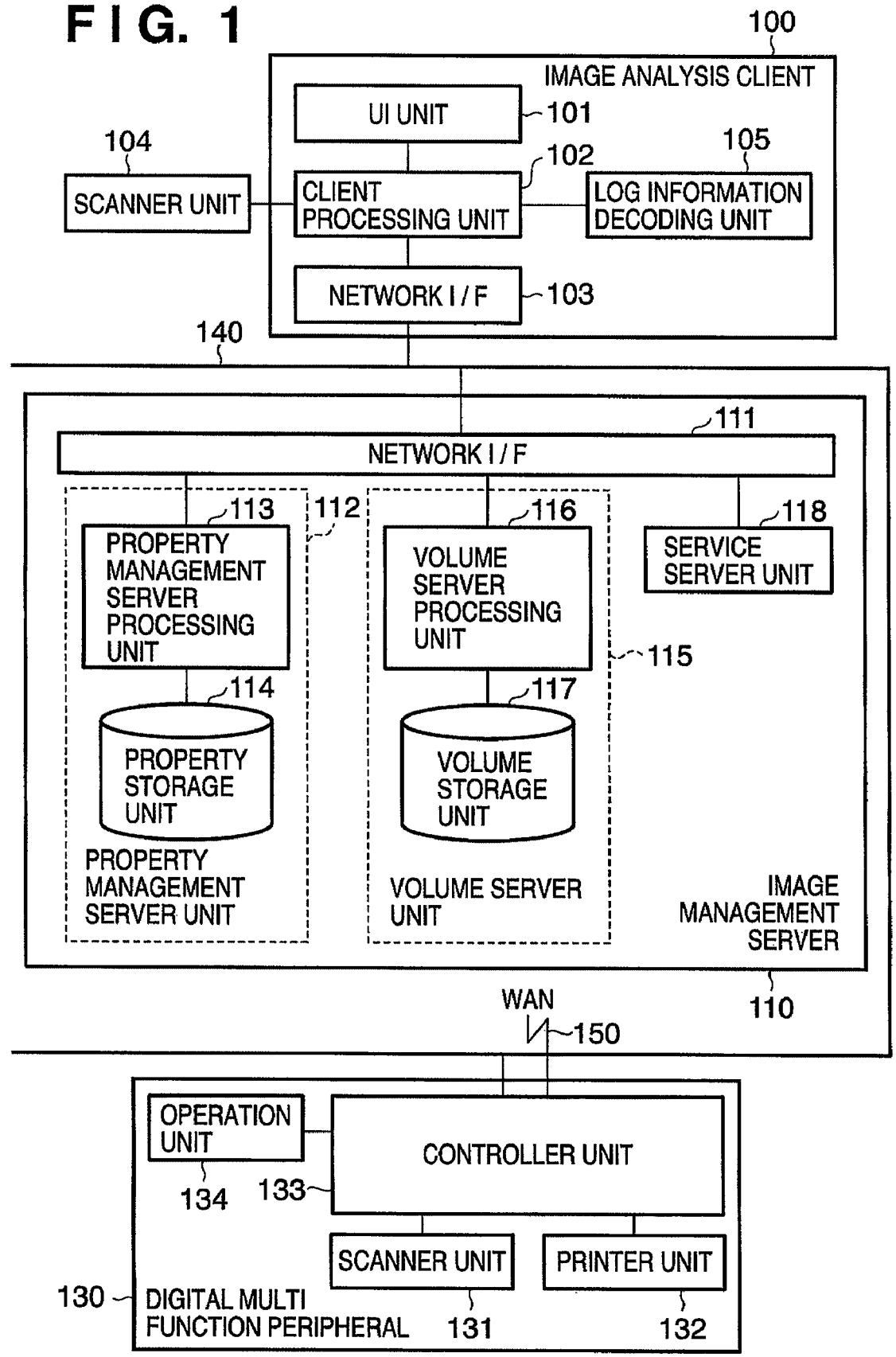
FIG. 1 is a block diagram showing the overall configuration of an image processing system in an embodiment according to the present invention.

With reference to the accompanying drawings, the present invention will be described in detail below based on its preferred embodiments. Configurations illustrated in the embodiments below are only exemplary, and the present invention is not limited by the configurations shown in the drawings.

First Embodiment

System Configuration

FIG. 1 is a block diagram showing the overall configuration of an image processing system in an embodiment. The system consists of an image management server 110, a digital multi-function peripheral 130, and an image analysis client 100, which are interconnected over a network 140. That is, the image management server 110 holds and manages log information, and content image data as needed, for image forming jobs processed in the digital multi-function peripheral 130. The image analysis client 100 can search for the log information and so on held in the image management server 110 to trace back a formed image.

The image management server 110 manages log information and content image data for jobs transmitted from the digital multi-function peripheral 130. The image management server 110 consists of a network I/F 111, a property management server unit 112, a volume server unit 115, and a service server unit 118. In this embodiment, the property management server unit 112, the volume server unit 115, and the service server unit 118 are configured as processes on a single computer. However, each process may be configured on a different computer connected with the other computers over the network 140. The property management server unit 112 and the volume server unit 115 may even be provided inside the digital multi-function peripheral 130 if the storage device capacity of the digital multi-function peripheral 130 is large enough, although they are configured here on the computer residing in the network.

The network I/F 111 connects to the network 140 and performs processing of a network protocol such as TCP/IP.

The property management server unit 112 manages a nested relationship among folders, documents, and pages, as well as their properties and so on so that log information and content image data for a job can be managed as a document stored in hierarchical folders. The property management server unit 112 consists of a property management server processing unit 113 and a property storage unit 114. The property management server processing unit 113 is implemented by a CPU reading and executing a program stored in memory in the apparatus. The property management server processing unit 113 updates and searches the property storage unit 114 in response to a request from the service server unit 118 made based on a request command from the digital multi-function peripheral 130 or the image analysis client 100, and returns the processing result to the service server unit 118. The service server unit 118 transmits the processing result mainly to the image analysis client 100. The property storage unit 114 can store folder properties, document properties, log information, page properties, and so on, and is typically a hard disk or the like.

The volume server unit 115 accumulates and manages content image data associated with pages in the property management server unit 112, and consists of a volume server processing unit 116 and a volume storage unit 117. The volume server processing unit 116 is implemented by the CPU reading and executing a program stored in the memory in the apparatus. The volume server processing unit 116 performs processing such as update, search, and data acquisition for the volume storage unit 117 in response to a request from the service server unit 118 made based on a request command from the digital multi-function peripheral 130 or the image analysis client 100. The volume server processing unit 116 transfers the processing result to the service server unit 118. The service server unit 118 transmits the processing result mainly to the image analysis client 100. The volume storage unit 117 can store content image data and is typically an auxiliary storage device such as a hard disk.

As is the case with the above-described server processing units 113 and 116, the service server unit 118 is implemented by the CPU reading and executing a program stored in the memory in the apparatus. The service server unit 118 receives a request command from the digital multi-function peripheral 130 or the image analysis client 100 via the network I/F 111 and performs requested processing. If processing involving the property management server unit 112 or the volume server unit 115 arises, such as registration of log information and content image data for a job, the service server unit 118 issues various kinds of request commands to these units via the network I/F 111. Upon reception of responses to these commands, the service server unit 118 transmits the processing result to the digital multi-function peripheral 130.

The digital multi-function peripheral 130 is an image forming apparatus having multiplex functions of a copier, scanner, printer, facsimile, and so on. The digital multi-function peripheral 130 consists of a scanner unit 131 serving as an image input device, a printer unit 132 serving as an image output device, a controller unit 133, and an operation unit 134 serving as a user interface. The scanner unit 131, the printer unit 132, and the operation unit 134 are each connected to the controller unit 133, which is connected to the network (LAN) 140 and a public line (WAN) 150.

The controller unit 133 processes a copy job, print job, and so on based on input information from the operation unit 134 to supply information such as the apparatus state and the job state to the operation unit 134 and to store generated content image data and log information. If processing involving the image management server 110 arises, the controller unit 133 transmits a request command to the service server unit 118 and receives a response thereto to supply information obtained from the image management server 110 to the operation unit 134.

The image analysis client 100 has access to document information (log information and content image data) managed in the image management server 110 and searches for and displays the document information. That is, the image analysis client 100 functions as an analysis client in this system, and is used for tracing back and investigating through which course information leaked out when an information leak is discovered.

The image analysis client 100 consists of a user interface (UI) unit 101, a client processing unit 102, a network I/F 103, a scanner unit 104, and a log information decoding unit 105.

The UI unit 101 receives operator instructions related to the functions of the image analysis client 100, such as scanning, displaying a scanned image, and searching for and displaying the document information in the server, and provides the operator with various kinds of information such as the processing result of the instructions. The UI unit 101 consists of a display device that is typically a CRT display, a liquid crystal display, or the like, and input devices such as a keyboard and a pointing device.

The client processing unit 102 includes a CPU and memory and controls processing of each function of the image analysis client 100, such as searching for and displaying the document information. For example, if processing involving the image management server 110 arises, the client processing unit 102 transmits various kinds of request commands to the image management server 110 via the network I/F 103 and receives responses thereto.

The log information decoding unit 105 is implemented as a CPU-executed program stored in memory in the apparatus and is used for extracting digital watermark data from an image read by the scanner unit 104 and obtaining log information.

Detailed Configuration of Image Management Server

Figure 2:
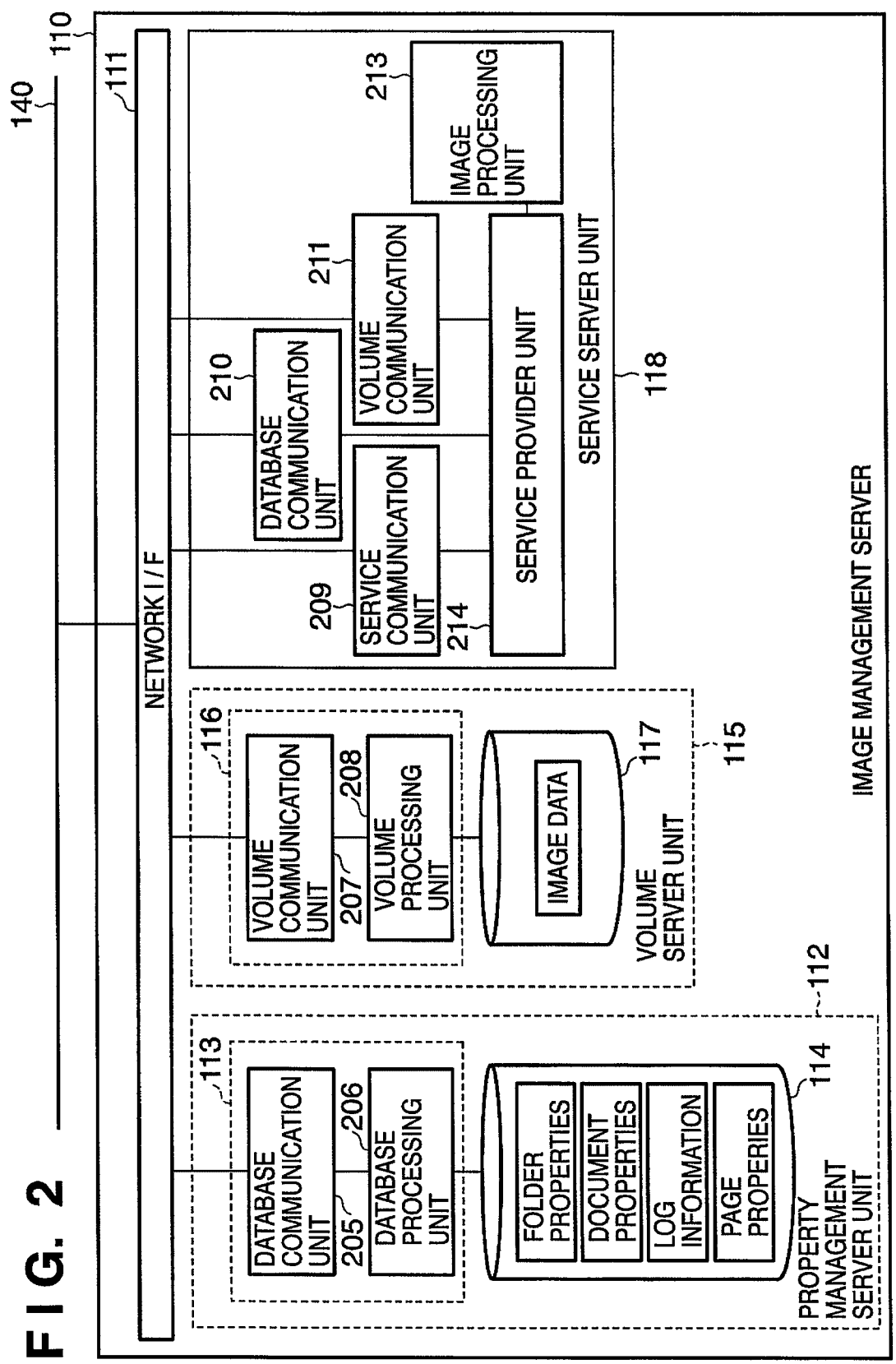
FIG. 2 is a block diagram showing the functional configuration of an image management server in the embodiment.

FIG. 2 is a block diagram showing the functional configuration of the image management server 110 shown in FIG. 1. Like elements as in FIG. 1 are given like symbols.

First, communication with the image analysis client 100 will be described. The client processing unit 102 of the image analysis client 100 reads through the scanner unit 104 an image that may have caused an information leak and should be analyzed for tracing back, and generates search target image data. The client processing unit 102 then detects log information by analyzing log information embedded as a digital watermark in the generated image data. If log information is obtained, the client processing unit 102 transmits the log information and the read image data as a search target to the image management server 110 via the network I/F 103. If the log information analysis ends in failure, the client processing unit 102 transmits only the image data as a search target to the image management server 110. In either case, the client processing unit 102 requests that log information that matches the obtained information be returned as a search result. Details of the log information will be described later.

Next, communication with the digital multi-function peripheral 130 will be described. A storage request command for requesting storage of log information and content image data is transmitted to the service server unit 118 from the digital multi-function peripheral 130. The service server unit 118 adds or updates log information and content image data according to the storage request command and transmits the result to the digital multi-function peripheral 130.

The service server unit 118 of the image management server 110 consists of a service communication unit 209, a database communication unit 210, a volume communication unit 211, an image processing unit 213, and a service provider unit 214.

The service communication unit 209, when a request command for the image management server 110 is received from the digital multi-function peripheral 130 via the network I/F 111, supplies the request to the service provider unit 214. The service communication unit 209 then transmits the processing result as a response command to the digital multi-function peripheral 130. This communication is performed with the SOAP protocol on the HTTP protocol.

The service provider unit 214 performs document information registration, property modification, and search processing according to a request from the service communication unit 209 and returns the processing result. For example, when content image data and log information for a job is received from the digital multi-function peripheral 130, the service provider unit 214 receives the content image data and the log information from the service communication unit 209. After temporarily storing them in the hard disk drive in the apparatus, the service provider unit 214 supplies a document registration request for the content image data and the log information to the database communication unit 210 and the volume communication unit 211 and receives the processing result.

The image processing unit 213, when only image data is transmitted from the image analysis client 100, matches the content image data stored in the volume storage unit 117 and the received image data through the volume communication unit 211. The technique of this image data matching will not be described herein because various known methods can be applied thereto.

The property management server processing unit 113 of the image management server 110 consists of a database communication unit 205 and a database processing unit 206. When the database communication unit 205 receives a request command for the property management server unit 112 from the database communication unit 210 according to a request from the service provider unit 214, the database communication unit 205 functions as follows. The database communication unit 205 supplies the request to the database processing unit 206 and transmits the processing result to the database communication unit 210. The database processing unit 206 performs processing such as update and data acquisition for the property storage unit 114 that manages properties.

Figure 3:
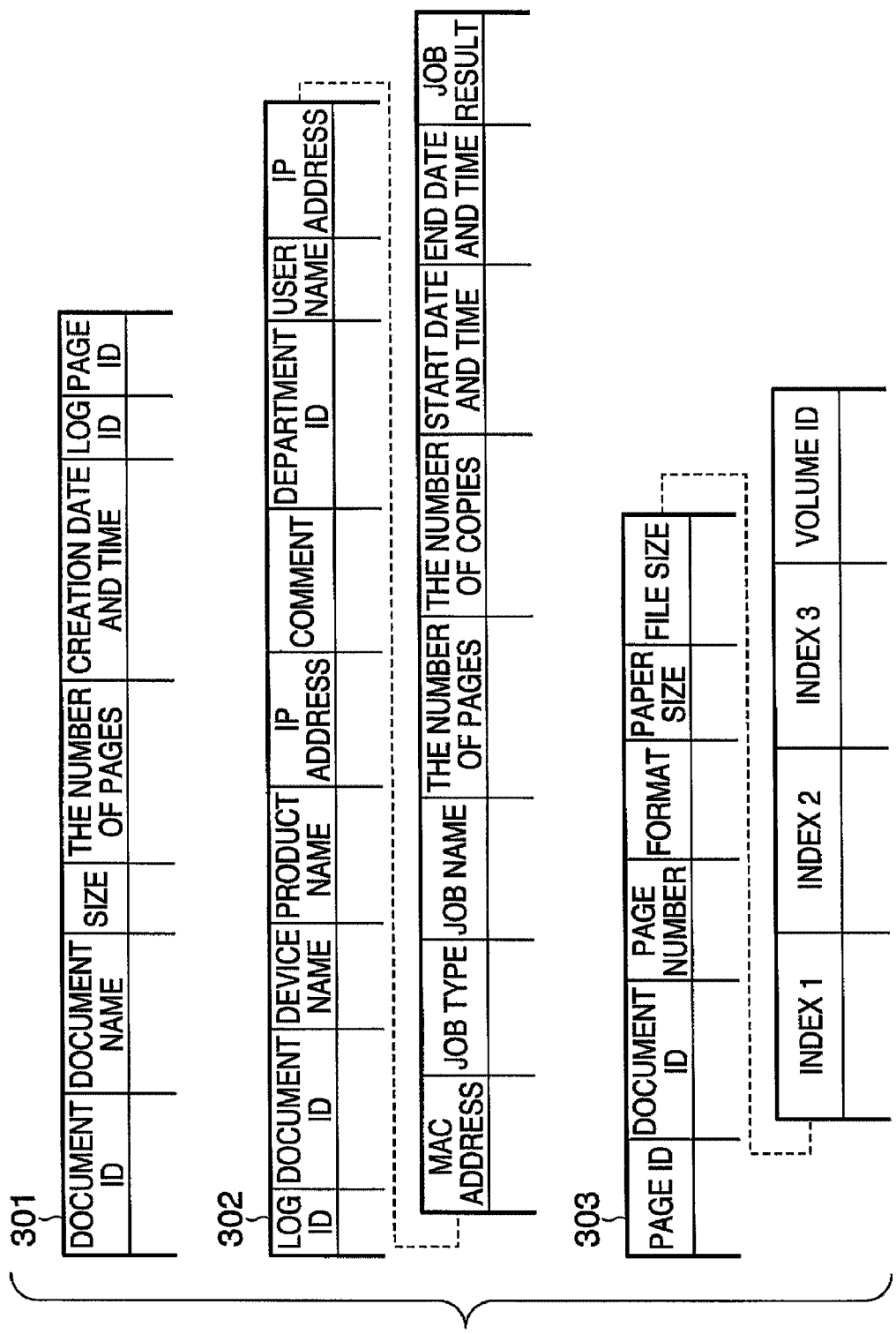
FIG. 3 is a diagram showing exemplary table definitions in a property storage unit of the image management server of the embodiment.

Now, FIG. 3 shows exemplary definitions of tables in the property storage unit 114 referenced to by the database processing unit 206 in the property management server unit 112 of the image management server 110 for managing the nested relationship among folders, documents, and pages, and their properties.

In FIG. 3, reference numeral 301 denotes a document management table, which includes the document ID for identifying a document, document name, size, number of pages, creation date and time, log ID for identifying a corresponding log, and page ID. A plurality of associated page IDs may be recorded for one document ID, so that a document made up of a plurality of pages is recorded with their respective page IDs. Also, since the same document may be processed in a plurality of jobs as generation copies are made, one document may have a plurality of log IDs.

Reference numeral 302 denotes a log information management table, which includes the log ID for identifying a log; device name, product name, IP address, and comment as device information; and department ID, user name, IP address, and MAC address as user information. The log information management table 302 further includes the job type, job name, number of pages, number of copies, start date and time, end date and time, and job result as job information; and document ID for identifying a corresponding document.

Reference numeral 303 denotes a page management table, which includes the page ID for identifying a page, document ID for identifying a parent document, page number, format for identifying the file format of the page data, and paper size for identifying the paper size in the case of image data. The page management table 303 further includes the file size, indices 1 to 3 for page search, and volume ID for identifying image data managed in the volume server unit 115.

The volume server processing unit 116 of the image management server 110 consists of a volume communication unit 207 and a volume processing unit 208. When the volume communication unit 207 receives a request command for the volume server unit 115 from the volume communication unit 211 according to a request from the service provider unit 214 having received the processing result of the database communication unit 205, the volume communication unit 207 functions as follows. The volume communication unit 207 supplies the request to the volume processing unit 208 and transmits the processing result to the volume communication unit 211. The volume processing unit 208 performs processing such as update and data acquisition for the volume storage unit 117 that is a volume file.

Figure 4:
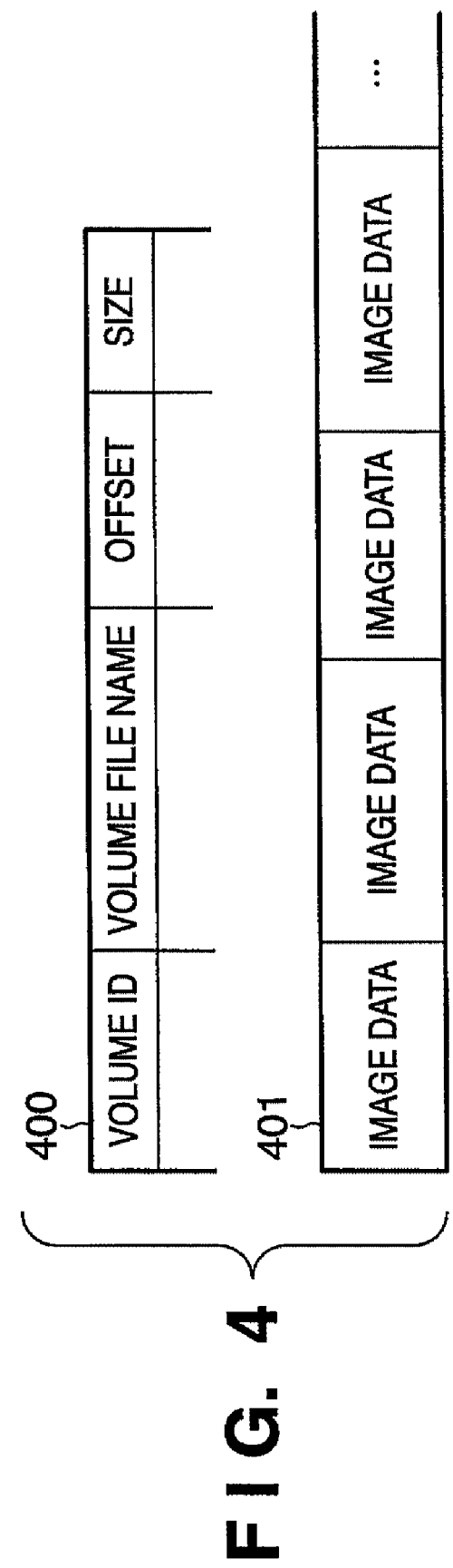
FIG. 4 is a diagram showing exemplary data structures in a volume storage unit of the image management server of the embodiment.

Now, FIG. 4 shows exemplary data structures in the volume storage unit 117 referenced to by the volume processing unit 208 for adding or obtaining content image data. In FIG. 4, reference numeral 400 denotes a volume management file, which includes the volume ID for identifying data, file name for identifying a volume storage file in which the data is stored, offset as the starting position of storage of the data, and size of the data. Reference numeral 401 denotes a volume storage file, in which image data, that is, content data is stored.

Detailed Configuration of Digital Multi-Function Peripheral

Figure 5:
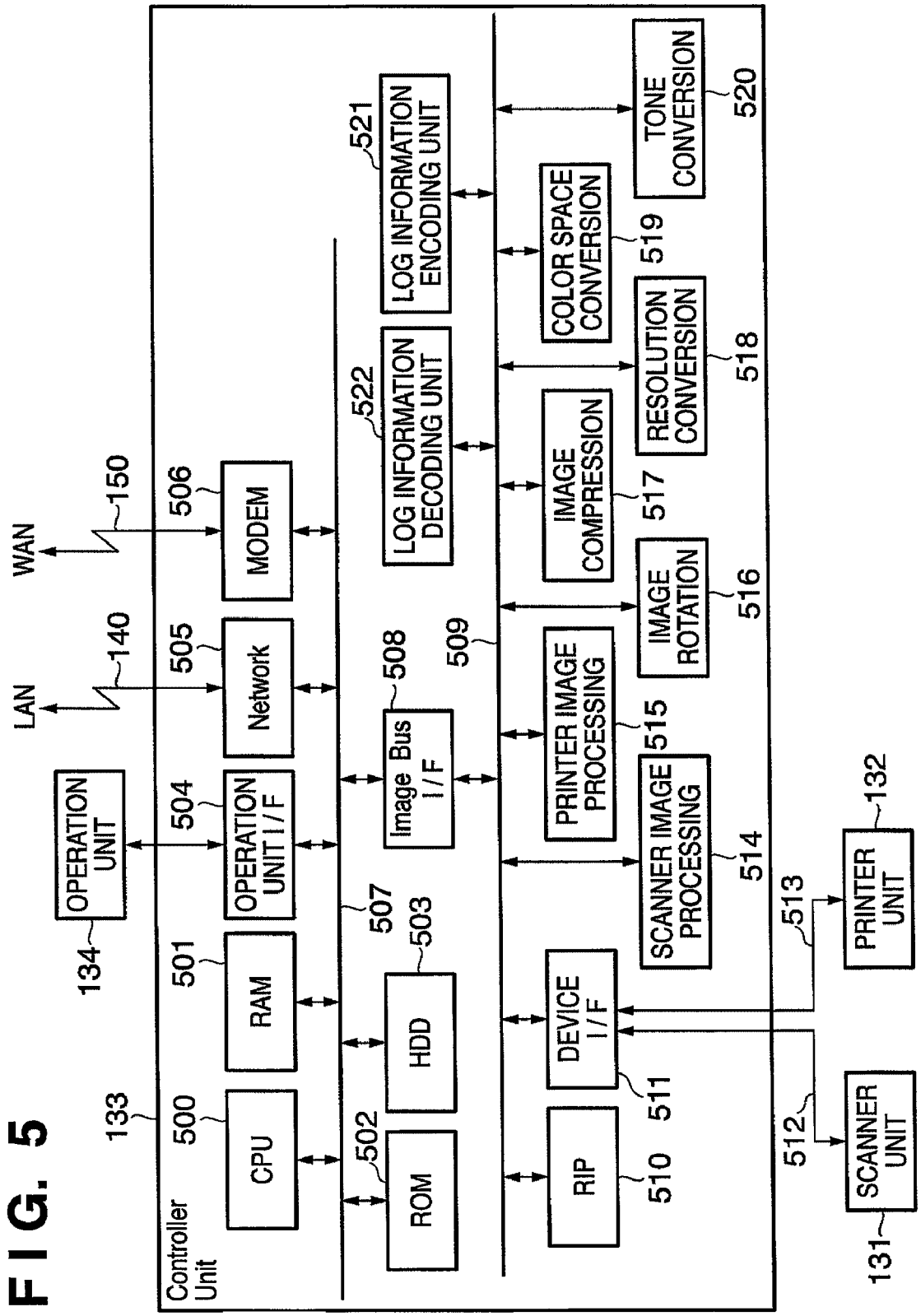
FIG. 5 is a block diagram showing the configuration of a digital multi-function peripheral in the embodiment.

FIG. 5 is a block diagram showing the configuration of the digital multi-function peripheral 130. Like elements as in FIG. 1 are given like symbols.

As shown in FIG. 5, the controller unit 133 of the digital multi-function peripheral 130 connects with the scanner unit 131 serving as an image input device and with the printer unit 132 serving as an image output device, while connecting with the LAN 140 and the WAN 150. This allows the controller unit 133 to input and output image information and device information. The configuration of the controller unit 133 shown in FIG. 5 will be described in detail below.

Reference numeral 500 denotes a CPU controlling the entire system. Reference numeral 501 denotes RAM, which functions as system work memory for the CPU 500 to operate, and as image memory (buffer memory) for temporarily storing input image data. Reference numeral 502 denotes ROM, which stores a boot program for the system. Reference numeral 503 denotes a hard disk drive (HDD), which stores system software, content data and log information for jobs, and so on. Reference numeral 504 denotes an operation unit I/F serving as an interface unit interfacing with the operation unit 134. The operation unit IF 504 outputs image data for display on the operation unit 134 to the operation unit 134. The operation unit I/F 504 also has a role of conveying to the CPU 500 information input by an operator through the operation unit 134. Reference numeral 505 denotes a network unit (Network), which connects to the LAN 140 to input and output information. Reference numeral 506 denotes a modem, which connects to the WAN 150 to input and output image information. The above devices are arranged on a system bus 507.

Reference numeral 508 denotes an image bus I/F. The image bus I/F 508 is a bus bridge connecting the system bus 507 and an image bus 509 that transfers image data at a high speed, and converting between data structures. The image bus 509 is implemented by the PCI bus or IEEE1394. The following devices are arranged on the image bus 509.

Reference numeral 510 denotes a raster image processor (RIP), which transforms PDL code as a bitmap image. Reference numeral 511 denotes a device I/F unit, which connects the scanner unit 131 and the printer unit 132 serving as image input/output devices to the controller unit 133 via an image input unit interface 512 and a printing unit interface 513, and converts between synchronous and asynchronous image data. Reference numeral 514 denotes a scanner image processing unit, which corrects, modifies, and edits input image data. The scanner image processing unit 514 also has a function of determining whether input image data is a color document or a monochrome document from a chroma signal of the image data and holding the determination result. Reference numeral 515 denotes a printer image processing unit, which corrects, modifies, and edits output image data.

Reference numeral 516 denotes an image rotation unit, which cooperates with the scanner image processing unit 514 to rotate image data and store it in memory (such as the RAM 502) while the scanner unit 131 reads the image. The image rotation unit 516 can also rotate image data in the memory and store it again, or can cooperate with the printer image processing unit 515 to rotate image data while printing out the image data. Reference numeral 517 denotes an image compression unit, which performs JPEG compression/decompression processing for multi-valued image data, and JBIG, MMR, MR, or MH compression/decompression processing for binary image data. Reference numeral 518 denotes a resolution conversion unit, which converts the resolution of image data in the memory and stores it again. Reference numeral 519 denotes a color space conversion unit, which performs matrix operations to convert YUV image data in the memory into Lab image data, for example, and store it again. Reference numeral 520 denotes a tone conversion unit, which uses a technique such as error diffusion processing to convert 8-bit (256-tone) image data in the memory into 1-bit (2-tone) image data, for example, and store it again.

The image rotation unit 516, the image compression unit 517, the resolution conversion unit 518, the color space conversion unit 519, and the tone conversion unit 520 can each be concatenated with the others to operate. For example, to subject image data in the memory to image rotation and resolution conversion, the two kinds of processing can be successively performed without memory involvement after the completion of one of them.

The controller unit 133 further includes a log information encoding unit 521 and a log information decoding unit 522.

The log information encoding unit 521 converts log information in the same format as the log information 302 shown in FIG. 3 into digital watermark data with an error correction code and superimposes the data on an image. This processing is performed immediately before the image is sent from the printer image processing unit 515 to the printer unit 132, so that the image is printed with the digital watermark data superimposed thereon.

The log information decoding unit 522 extracts digital watermark data from an image read by the scanner unit 131 and obtains log information. The error correction code is used here to enable highly accurate detection even from a somewhat deteriorated image. This embodiment is characterized in that the error correction rate is computed and recorded at this point so that it is referenced to as the reliability of the digital watermark data. This error correction processing will be described later.

It is assumed that both the log information encoding unit 521 and the log information decoding unit 522 are implemented as ASICs in order to ensure the real-time nature. The digital watermark technique will not be described in detail herein because known methods can be applied thereto.

Figure 6:
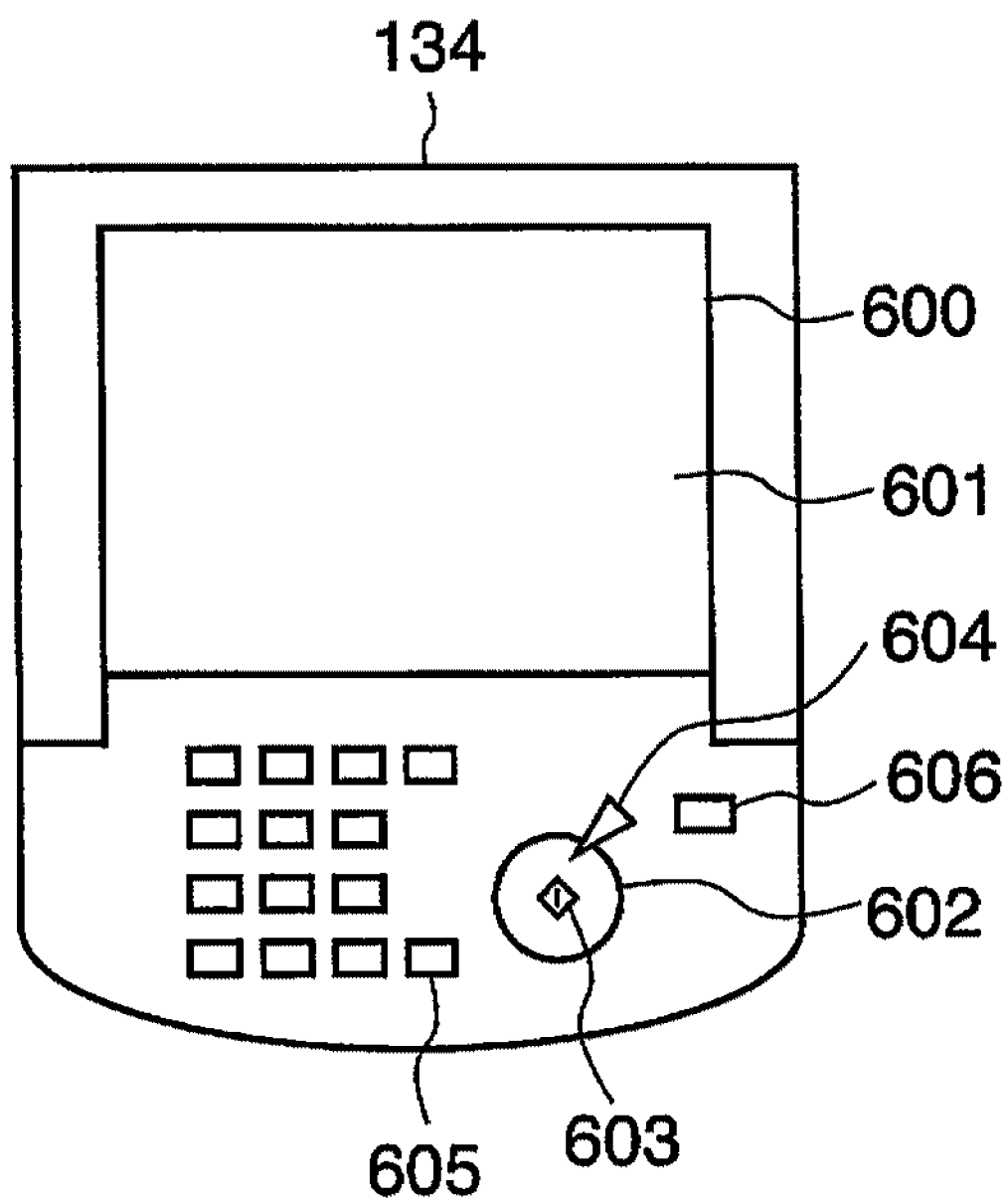
FIG. 6 is a diagram showing an external view of an operation unit in the digital multi-function peripheral of the embodiment.

FIG. 6 shows an external view of the operation unit 134. An LCD display unit 600 has a touch panel sheet 601 adhered on an LCD, in which an operation screen for the system and soft keys are displayed. When a displayed key is pressed, position information on the key is conveyed to the CPU 500 in the controller unit 133. A start key 602 is used for such purposes as starting the operation of reading a document image. At the center of the start key 602 is a bicolor (green and red) LED 603, the color of which indicates whether or not the start key 602 is ready for use. A stop key 604 serves to stop ongoing operation. An ID key 605 is used to enter a user's user ID. A reset key 606 is used to initialize settings made through the operation unit.

Figure 7:
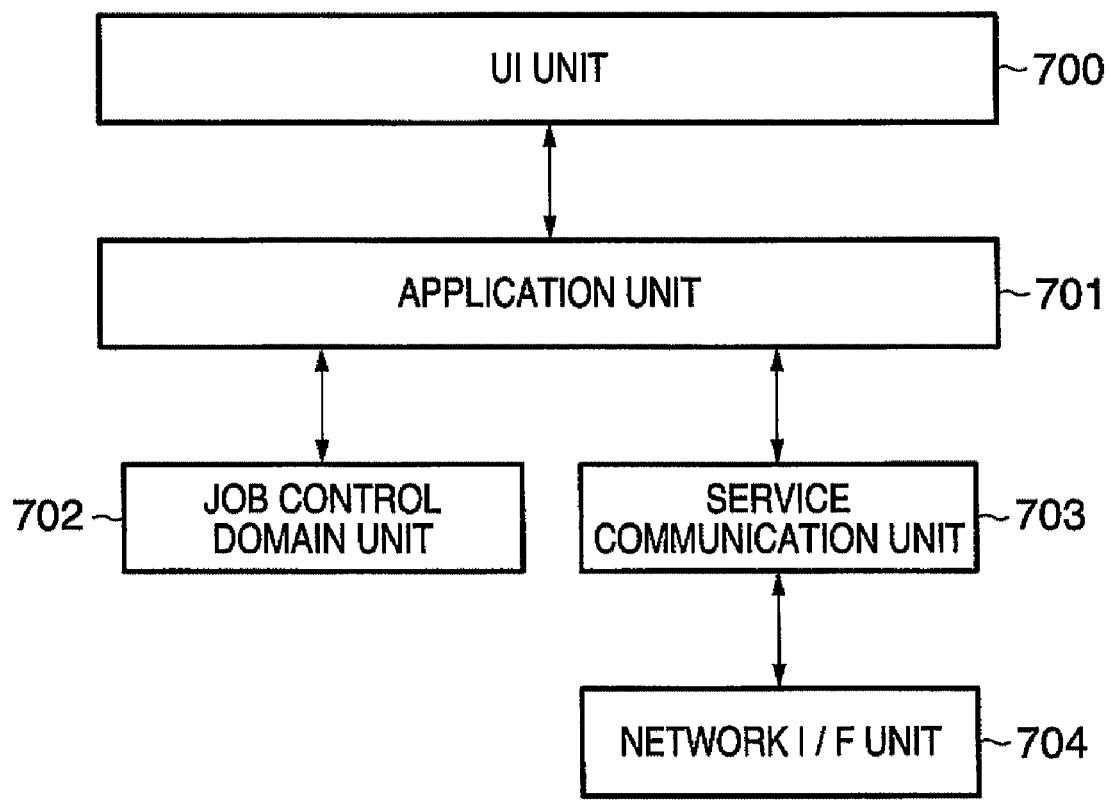
FIG. 7 is a block diagram showing the functional configuration of system software in the digital multi-function peripheral of the embodiment.

FIG. 7 is a block diagram showing the functional configuration of the system software in the controller unit 133 of the digital multi-function peripheral 130.

A user interface (UI) unit 700 supplies input information from the operator to an application unit 701 and receives the processing result from the application unit 701 to generate a display screen for the operation unit 134.

The application unit 701 performs processing according to a request from the UI unit 700. For example, when copying is requested, the application unit 701 passes a copy job along with specified settings to a job control domain unit 702 and receives information such as the device state and the job state from the job control domain unit 702. To transmit content image data and log information for a job to the image management server 110, the application unit 701 first receives the image data and the log information for the job from the job control domain unit 702. The application unit 701 then provides a service communication unit 703 with a request to transmit the content image data and the log information for the job and receives the processing result. To perform resolution conversion processing or data conversion processing for content image data, the application unit 701 first receives image data and log information for a job from the job control domain unit 702. The application unit 701 then performs resolution conversion processing or data conversion processing for the image data for the job, provides the service communication unit 703 with a request to transmit the content image data and the log information, and receives the processing result.

The job control domain unit 702 controls processing of a plurality of jobs, such as a scan job, copy job, print job, and FAX job. For example, when a copy job is passed, the job control domain unit 702 causes the scanner unit 131 and the printer unit 132 to operate based on specified copy settings. The job control domain unit 702 then causes a document to be read and its image data to be printed and stores the image data for the job in the HDD 503 in association with log information for the job, including device information, user information, and job information. The resolution of image data for a job may be 600×600 dpi in the case of a copy job, and 1200×1200 dpi in the case of a print job, for example. The job control domain unit 702 also supplies log information and image data stored in the HDD 503 to the application unit 701 according to a request from the application unit 701.

The service communication unit 703, with the SOAP protocol on the HTTP protocol, transmits a request command for the image management server 110 to the service communication unit 209 in the image management server 110 via a network I/F 704 and receives a response thereto. The network I/F 704 connects to the LAN 140 and performs processing of a network protocol such as TCP/IP.

Error Correction Processing

Error correction processing performed in the digital multi-function peripheral 130 of this embodiment will be described below. Various error correction codes have been proposed, and representative ones include the Reed-Solomon code, BCH code, Fire code, and Peterson code. Although any of them may be used as the error correction technique in this embodiment, the following description will take as an example the use of the BCH code, which has been adopted for various systems.

Let the BCH code be represented as BCH (n, k, d). That is, the BCH code has a code length of n bits, in which k bits is the number of bits of log information, and the remaining n-k bits are check bits. The symbol d represents the minimum distance between codes, and errors up to $t=[d/2]$ bits can be corrected.

For encoding, an optimal encoder and decoder need to be designed depending on the number of bits of log information and the digital watermark technique. Here, attention is focused on the fact that a plurality of errors can be detected.

Figure 8:
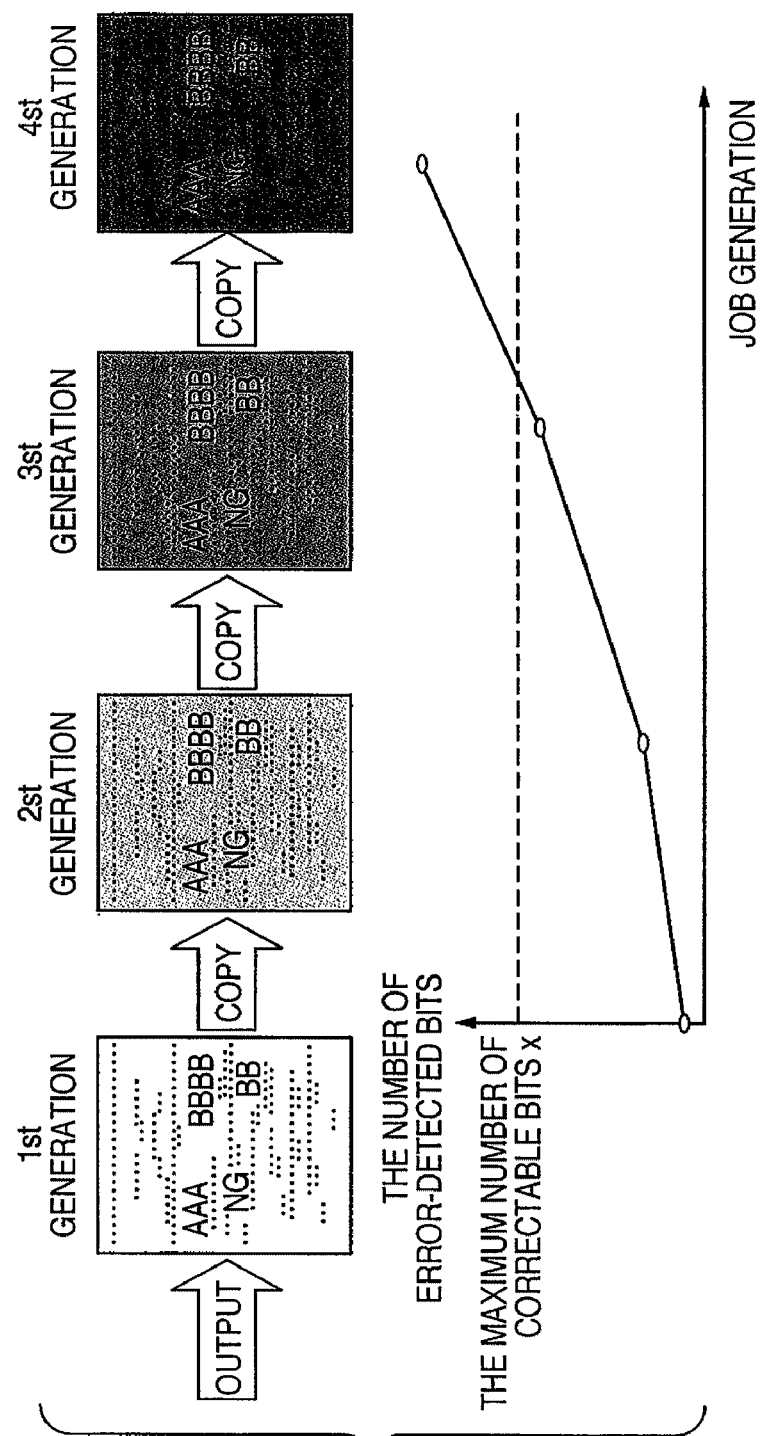
FIG. 8 is a diagram showing the relationship between the error correction rate and generation copies in the embodiment.

FIG. 8 shows that the error detection rate increases through generations made in jobs such as typical copy jobs or PDL print jobs. Description here will take copy job processing as an example, where the maximum error correction ability is x bits. Digital watermark data superimposed and printed on paper in the first copy job is subjected to error detection and correction of ×1 bit when scanned for the next copy job. This is directly printed to make a generation copy, and this generation copy is subjected to error detection and correction of ×2 bits, which is greater than ×1 bit, in the next scan. After repetitions of such copying, errors detected in a generation copy exceed x bits, that is, the maximum error correction ability. In this case, the digital watermark data superimposed on paper cannot be extracted.

This phenomenon cannot be avoided because of deterioration caused by the image input/output devices and by digital image processing, even with the robustness of the digital watermark taken into account.

This embodiment is characterized by controlling the storage of information into the image management server 110 and the operation of the log information encoding unit 521 according to the increase in the error correction rate as shown in FIG. 8, that is, the decrease in the reliability of the digital watermark information. Details of this control will be described later.

Image Forming Job Processing

Processing based on an image forming job in the digital multi-function peripheral 130 of this embodiment will be described below.

Figure 9:
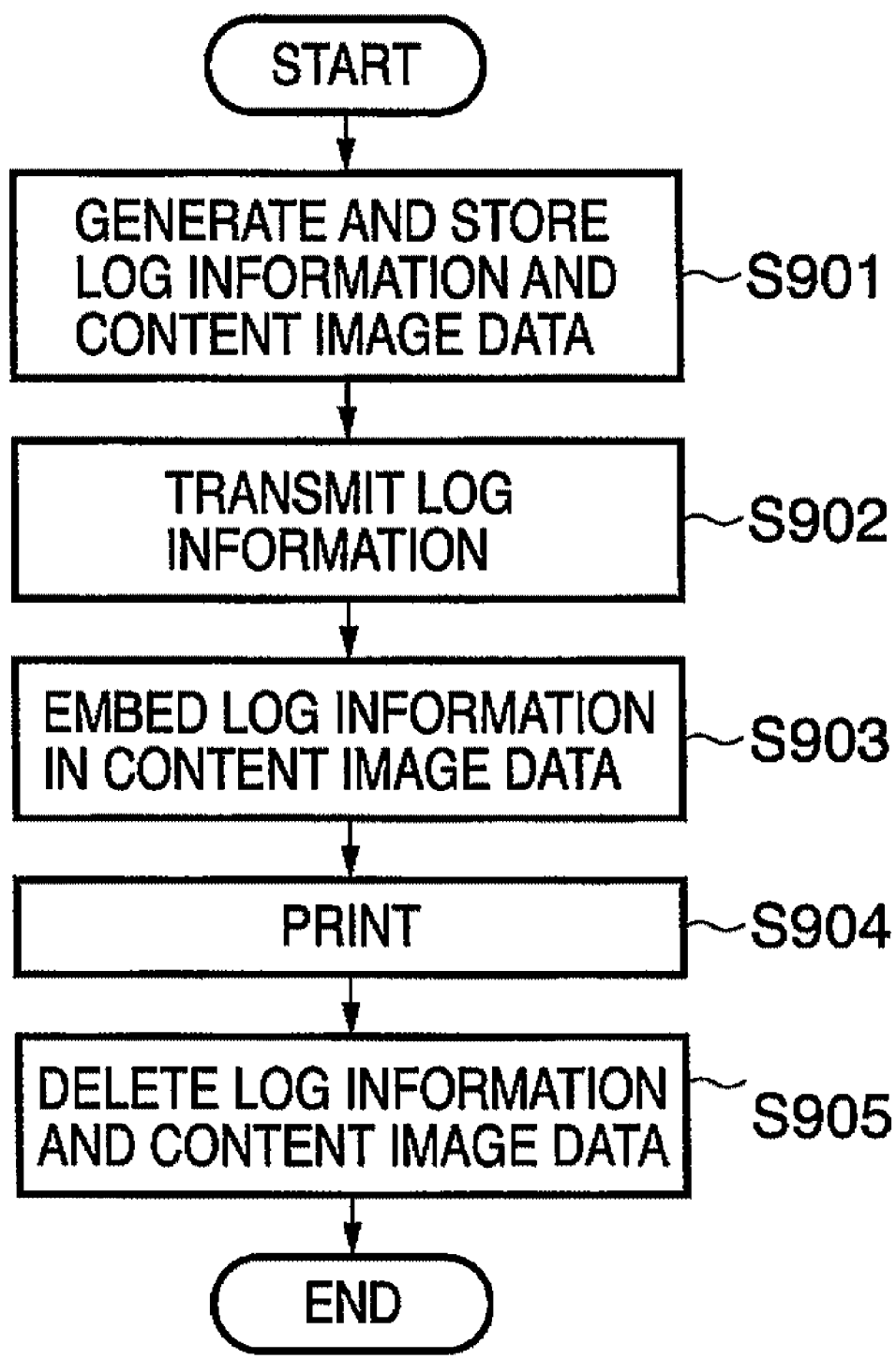
FIG. 9 is a flowchart showing first image forming job processing in the digital multi-function peripheral of the embodiment.

FIG. 9 is a flowchart showing processing of a print job according to PDL, that is, processing performed when image data written in PDL is printed on a recording medium for the first time.

When the processing is started, log information for the job is first generated in parallel with print job processing. The log information is stored in the HDD 503 along with content image data generated in the print job processing (S901). The content image data for the job generated here is image data for the job compressed with a compression technique such as JBIG.

Only the log information is transmitted for storage to the image management server 110 (S902). At the same time, the log information converted into digital watermark data is embedded in the content image data in the log information encoding unit 521 (S903) to produce a printout (S904).

Once the log information has been transmitted and the content image data has been output, the log information and the content image data are deleted from the HDD 503 (S905), and the processing terminates.

Figure 10:
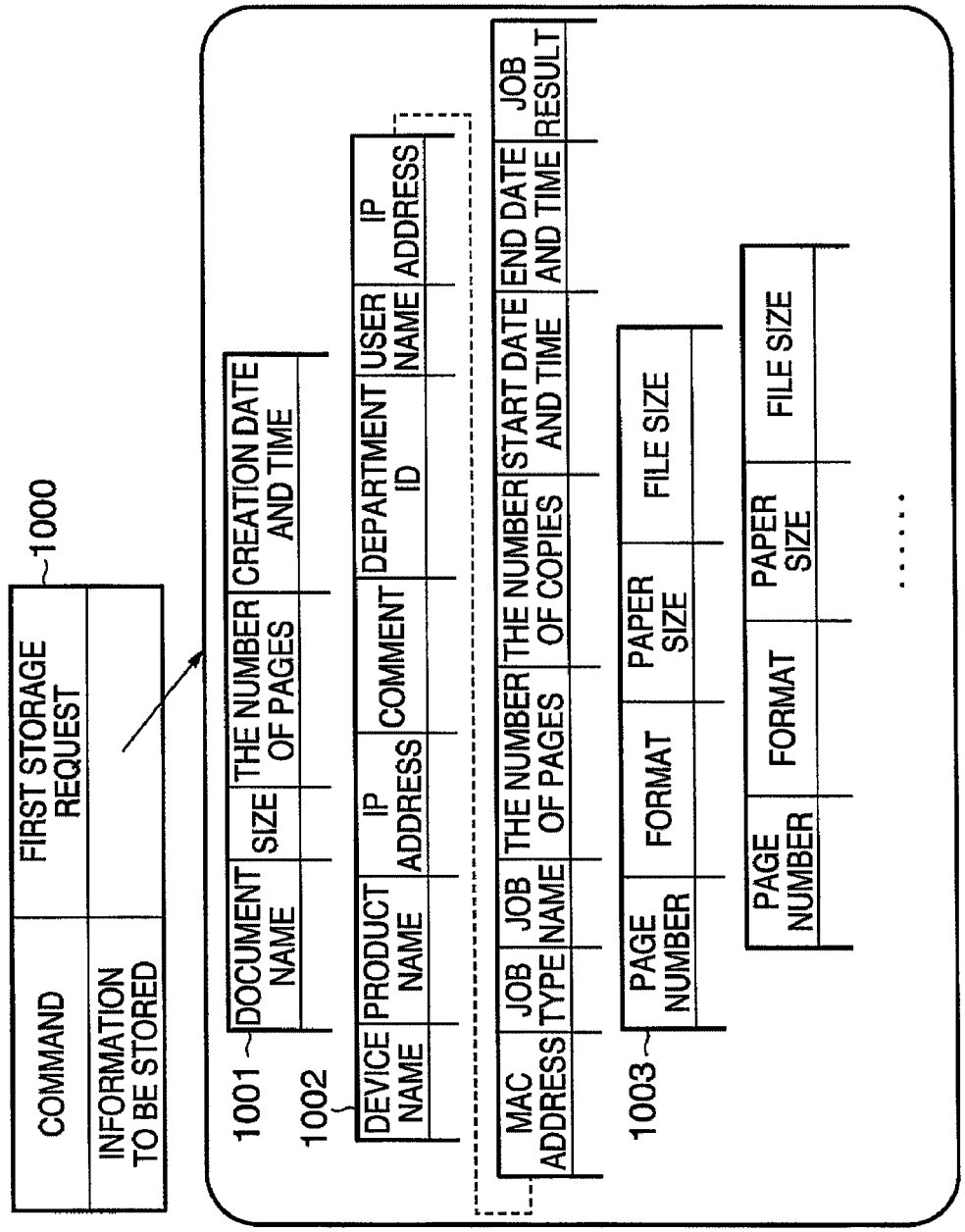
FIG. 10 is a diagram showing an example of a first document information storage command for the image management server in the embodiment.

FIG. 10 shows an exemplary request command for the image management server 110 used to transmit the log information in step S902 in FIG. 9. Since the job in this case is the first printing, the request command for the image management server 110 is issued as a "first storage request" command denoted by 1000 in FIG. 10. In this command, the information to be stored includes all items illustrated in the tables shown in FIG. 3.

The image management server 110 receives this "first storage request" command and performs processing of storing the log information for the first time. That is, the image management server 110 stores the transmitted information in the property storage unit 114 and assigns the document ID, log ID, and page ID as shown in FIG. 3.

The above-described processing is the first print processing. Next, the second and subsequent print processing, that is, generation copy processing, based on the recording medium output in the first print processing will be described.

Figure 11:
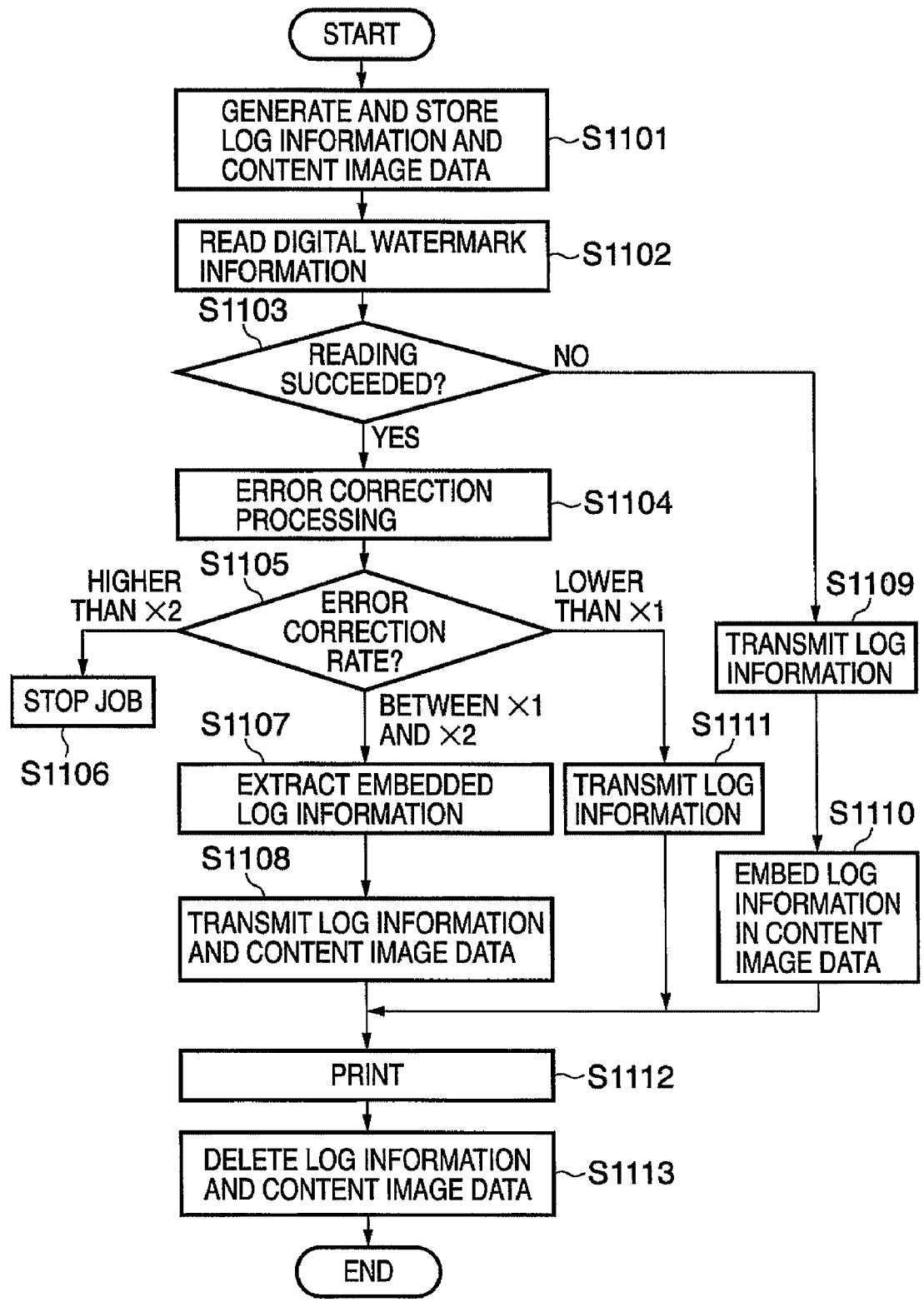
FIG. 11 is a flowchart showing second and subsequent image forming job processing in the digital multi-function peripheral of the embodiment.

FIG. 11 is a flowchart showing processing of a copy job in this embodiment. This copy job includes generation copying in which a printout made in the print job processing shown in FIG. 9 is used as an original.

When the processing is started, log information for the job is first generated in parallel with copy job processing. The log information is stored in the HDD 503 along with image data generated in the job processing, that is, image data read by the scanner unit 131 (hereafter referred to as content image data) (S1101).

Log analysis is performed by attempting to read digital watermark information from the content image data in the log information decoding unit 522 (S1102). Here, it is checked whether or not digital watermark information can be read, that is, whether or not log information exists as digital watermark information in the content image data (S1103).

If digital watermark information does not exist in the content image data, this job is considered as the first copy job. Then, only the log information generated and stored in the HDD 503 in step S1101 is transmitted for storage to the image management server 110 (S1109). The above-described "first storage request" command shown in FIG. 10 is used at this point.

While the log information is transmitted in step S1109, the log information is embedded in the content image data in the log information encoding unit 521 (S1110) to perform print operation (S1112). Thereafter, the log information and the content image data are deleted from the HDD 503 (S1113), and the processing terminates.

If log information exists as digital watermark information in the content image data in step S1103, processing of decoding the error correction code is performed (S1104) to check the value of the resulting error correction rate (S1105).

If the error correction rate is lower than a predetermined threshold level (Th1), that is, if the data has been adequately read, it can be determined that the digital watermark information will sufficiently remain on paper if the data is directly printed. Therefore, only the log information generated and stored in the HDD 503 in step S1101 is transmitted (S1111), and print operation is performed (S1112). Thereafter, the log information and the content image data are deleted from the HDD 503 (S1113), and the processing terminates.

Figure 13:
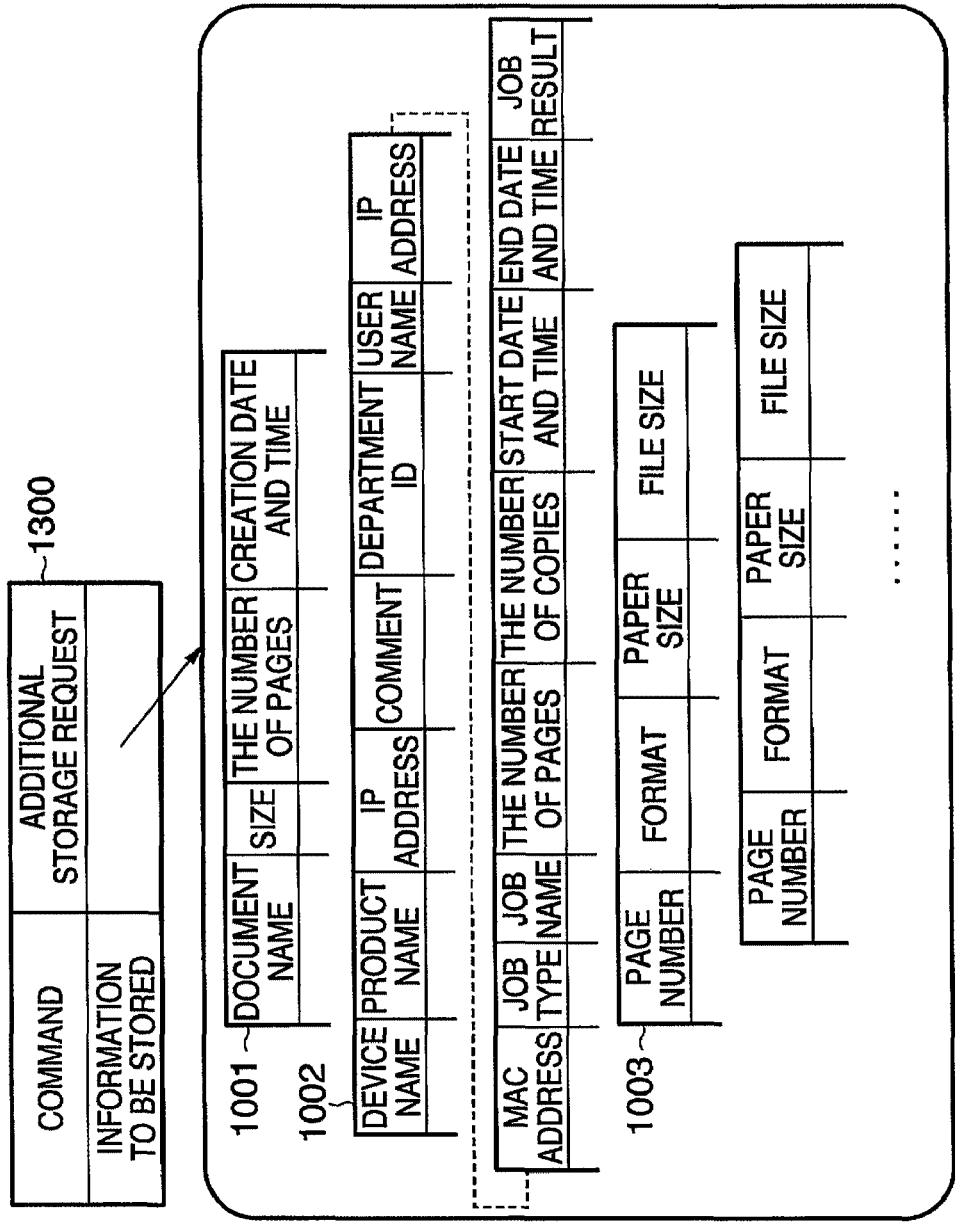
FIG. 13 is a diagram showing an example of an additional document information storage command for the image management server in the embodiment.

FIG. 13 shows an exemplary request command for the image management server 110 used to transmit only the log information in step S1111 in FIG. 11. Since the job in this case is the second or subsequent printing, the request command for the image management server 110 is issued as an "additional storage request" command denoted by 1300 in FIG. 13. This "additional storage request" command is almost the same as the "first storage request" command for the first printing shown in FIG. 10. As in FIG. 10, the information to be stored includes all items illustrated in the tables shown in FIG. 3.

The image management server 110 receives this "additional storage request" command and performs processing of additionally storing the new log information. That is, the image management server 110 stores the transmitted log information in the property storage unit 114 and assigns the document ID, log ID, and page ID as shown in FIG. 3.

If the error correction rate is within a predetermined range (Th1 to Th2) in step S1105, the log information for the last performed job already embedded in the content image data is extracted (S1107). The log information and the content image data generated in step S1101 are transmitted for storage to the image management server 110 along with the log information for the last job extracted in step S1107 (S1108). After print operation (S1112) is finished, the log information and the content image data are deleted from the HDD 503 (S1113), and the processing terminates.

FIG. 12 shows an exemplary request command for the image management server 110 used to transmit the old and new versions of log information and the content image data in step S1108 in FIG. 11. Since the job in this case is the second or subsequent printing, the request command for the image management server 110 is issued as an "additional storage request" command denoted by 1200 in FIG. 12. In contrast to the "first storage request" command for the first printing shown in FIG. 10 and the "additional storage request" command shown in FIG. 13, this "additional storage request" command is characterized by containing the log information for the last job. As in FIG. 10, the information to be stored and the log information for the last job in the request command shown in FIG. 12 include all items illustrated in the tables shown in FIG. 3.

The image management server 110 receives this "additional storage request" command shown in FIG. 12 and performs processing of additionally storing the new log information and the content image data. That is, the image management server 110 stores the transmitted new log information in the property storage unit 114 and assigns the document ID, log ID, page ID, and volume ID as shown in FIG. 3. According to the volume ID, the image management server 110 stores the transmitted content image data in the volume storage unit 117 in the format shown in FIG. 4.

In this manner, additional registration is performed in the image management server 110. This allows the image management server 110 to know the creation of a generation copy of a document generated in a previously performed job.

If the error correction rate exceeds the predetermined threshold (Th2) in step S1105, the job is stopped (S1106). This can prevent the content image data from being further printed on paper when the traceability cannot be ensured because of deterioration of the content image data.

Thus, as described above, in image forming based on an image forming job, the digital multi-function peripheral 130 of this embodiment controls the content to be stored in the image management server 110 depending on the number of jobs performed and the quality of the embedded log.

Therefore, for example, only the log information is recorded in the image management server 110 for the first image forming job. This allows significant reduction from the large capacity of a recording device conventionally required for recording all image data, thereby allowing cost reduction.

For the second- and subsequent-generation copies and printouts that will be usually distributed, it is ensured that log information and content image data for a job are recorded in a pair on a paper medium itself or in the image management server 110. Therefore, the traceability of the distributed paper media is increased compared with the case where the data is only embedded in the image.

Other Embodiments

The present invention may adopt implementations as a system, apparatus, method, program, storage medium (recording medium), or the like, for example. Specifically, the present invention may be applied to a system composed of a plurality of devices (e.g., a host computer, interfacing device, imaging device, web application, etc.), or to an apparatus implemented as a single device.

The present invention may be achieved in such a manner that a program of software for implementing the functions of the above-described embodiment is directly or remotely supplied to the system or apparatus, and a computer of the system or apparatus reads out and executes the supplied program. The program in this case is a program corresponding to the flowcharts shown in the figures for the embodiment.

Therefore, a program code itself installed in the computer in order to implement functional processing of the present invention in the computer also realizes the present invention.

That is, the present invention also includes a computer program itself for implementing the functional processing of the present invention.

In this case, the program may take a form such as an object code, a program executed by an interpreter, or script data supplied to an OS, as long as it has program functions.

Computer-readable recording media for supplying the program include a floppy (registered trademark) disk, hard disk, optical disk, magneto-optical disk, MO, CD-ROM, CD-R, CD-RW, magnetic tape, nonvolatile memory card, ROM, and DVD (DVD-ROM and DVD-R), for example.

Alternatively, the program may be supplied by connecting to a website on the Internet via a browser on a client computer and downloading the computer program itself of the present invention (or a compressed file with an automatic installing function) from the website to a recording medium such as a hard disk. The program may also be supplied by dividing the program code that constitutes the program of the present invention into a plurality of files and by downloading different files from different websites. That is, the present invention also includes a WWW server that allows a plurality of users to download the program files for implementing the functional processing of the present invention in a computer.

The program of the present invention may be stored in an encrypted form in a storage medium such as a CD-ROM and distributed to users. A user who satisfies predetermined conditions may be allowed to download decryption key information from a website over the Internet. That is, the user may use the key information to execute the encrypted program and install the program into a computer.

The computer executes the read-out program to implement the functions of the above-described embodiment. Further, an OS or the like running on the computer may perform part or all of actual processing under instructions of the program to implement the functions of the above-described embodiment.

Further, the program read out from the recording medium may be written to memory provided in a function extension board inserted into the computer or in a function extension unit connected to the computer. The program may then be executed to implement the functions of the above-described embodiment. That is, a CPU or the like provided in the function extension board or function extension unit may perform part or all of actual processing under instructions of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-053337, filed Mar. 2, 2007, which is hereby incorporated by reference herein in its entirety.

What is claimed is:

1. An image processing system in which an image forming apparatus forming an image on a recording medium and an image management server having a storage unit are connected with each other, said image forming apparatus comprising:
   a transmission unit adapted to transmit data to be stored in the storage unit to the image management server;
   an image generation unit adapted to generate image data based on an image forming job;
   a log generation unit adapted to generate first log information about the image forming job;
   an analysis unit adapted to detect second log information embedded as a digital watermark from the image data and compute a reliability of the digital watermark; and
   a control unit adapted to perform control to transmit the first log information via said transmission unit if the reliability reaches a first level and to transmit the first log information and the image data via said transmission unit if the reliability does not reach the first level.

2. The image processing system according to claim 1, wherein said image forming apparatus further comprising
   an embedding unit adapted to embed the first log information as a digital watermark in the image data if said analysis unit does not detect the second log information,
   wherein said control unit performs control to transmit the first log information if said analysis unit does not detect the second log information.

3. The image processing system according to claim 1, wherein said image forming apparatus further comprising
   a job stopping unit adapted to stop processing based on the image forming job if the reliability does not reach a second level lower than the first level.

4. The image processing system according to claim 1, wherein said control unit performs control to further transmit the second log information via said transmission unit if the reliability does not reach the first level.

5. The image processing system according to claim 1, wherein said analysis unit computes, as the reliability, an error correction rate in error correction processing for the second log information.

6. The image processing system according to claim 1, wherein said image generation unit generates the image data by reading an image formed on a recording medium.

7. The image processing system according to claim 1, wherein
   a client apparatus capable of accessing the storage unit is further connected to the image management server, the client apparatus comprising:
   a search target generation unit adapted to read an image formed on a recording medium and generate search target image data;
   a detection unit adapted to detect third log information embedded as a digital watermark from the search target image data; and
   a search unit adapted to search the storage unit for the third log information.

8. An image processing apparatus comprising:
   an image generation unit adapted to generate image data based on an image forming job;
   a log generation unit adapted to generate first log information about the image forming job;
   an analysis unit adapted to detect second log information embedded as a digital watermark from the image data and compute a reliability of the digital watermark;
   a storage unit adapted to be able to store the first log information; and
   a control unit adapted to perform control to store the first log information in said storage unit if the reliability reaches a first level and to store the first log information and the image data in said storage unit if the reliability does not reach the first level.

9. The image processing apparatus according to claim 8, further comprising
   an embedding unit adapted to embed the first log information as a digital watermark in the image data if said analysis unit does not detect the second log information, wherein said control unit performs control to store the first log information in said storage unit if said analysis unit does not detect the second log information.

10. The image processing apparatus according to claim 8, further comprising
a job stopping unit adapted to stop processing based on the image forming job if the reliability does not reach a second level lower than the first level.

11. The image processing apparatus according to claim 8, wherein said control unit performs control to further store the second log information in said storage unit if the reliability does not reach the first level.

12. The image processing apparatus according to claim 8, wherein said analysis unit computes, as the reliability, an error correction rate in error correction processing for the second log information.

13. The image processing apparatus according to claim 8, wherein said image generation unit generates the image data by reading an image formed on a recording medium.

14. The image processing apparatus according to claim 8, further comprising:
a search target generation unit adapted to read an image formed on a recording medium and generate search target image data;
a detection unit adapted to detect third log information embedded as a digital watermark from the search target image data; and
a search unit adapted to search said storage unit for the third log information.

15. An image processing method in an image processing apparatus having a storage unit, comprising:
an image generation step in which an image generation unit generates image data based on an image forming job;
a log generation step in which a log generation unit generates first log information about the image forming job;
an analysis step in which an analysis unit detects second log information embedded as a digital watermark from the image data and computes a reliability of the digital watermark;
a first storage step in which a first storage control unit stores the first log information in the storage unit if the reliability reaches a first level; and
a second storage step in which a second storage control unit stores the first log information and the image data in the storage unit if the reliability does not reach the first level.

16. The image processing method according to claim 15, wherein in said analysis step, an error correction rate in error correction processing for the second log information is computed as the reliability.

17. A computer program stored in a computer-readable storage medium, the computer program causing a computer to perform the image processing method according to claim 15.

18. A computer-readable storage medium having stored therein the computer program according to claim 17.

* * * * *